United States Patent [19]

Tamura et al.

[11] Patent Number: 5,208,852
[45] Date of Patent: May 4, 1993

[54] SOUND GENERATION CIRCUIT

[75] Inventors: Tsuyoshi Tamura; Masaoki Sagara, both of Suwa, Japan

[73] Assignee: Seiko Epson Corporation, Tokyo, Japan

[21] Appl. No.: 864,176

[22] Filed: Apr. 3, 1992

Related U.S. Application Data

[63] Continuation of Ser. No. 784,742, Oct. 29, 1991, abandoned, which is a continuation of Ser. No. 412,367, Sep. 26, 1989, abandoned.

[30] Foreign Application Priority Data

Sep. 27, 1988 [JP] Japan .............................. 63-241633
Jun. 15, 1989 [JP] Japan .............................. 1-153490

[51] Int. Cl.$^5$ ............................................ H04M 1/50
[52] U.S. Cl. .................................. 379/353; 379/361; 379/418
[58] Field of Search ............... 379/418, 387, 372, 373, 379/374, 360, 361, 353

[56] References Cited

U.S. PATENT DOCUMENTS

| | | | |
|---|---|---|---|
| H118 | 9/1986 | Biggs et al. .................... | 374/374 X |
| 3,787,836 | 1/1974 | Hagelbarger .................... | 379/361 |
| 3,820,028 | 6/1974 | Thomas ........................... | 379/361 X |
| 4,058,805 | 11/1977 | Lake ................................ | 379/360 X |
| 4,061,856 | 12/1977 | Callahan, Jr. et al. ........... | 379/361 |
| 4,064,367 | 12/1977 | O'Malley ......................... | 379/360 X |
| 4,132,871 | 1/1979 | Lake ................................ | 379/361 X |
| 4,273,019 | 6/1981 | Goto ................................ | 84/1.24 |
| 4,328,731 | 5/1982 | Gotho et al. .................... | 84/1.01 |
| 4,390,754 | 6/1983 | Holberg ........................... | 379/361 X |
| 4,571,462 | 2/1986 | Janssen ........................... | 379/375 X |

FOREIGN PATENT DOCUMENTS

| | | | |
|---|---|---|---|
| 0147791 | 7/1985 | European Pat. Off. ............ | 379/361 |
| 0213846 | 3/1987 | European Pat. Off. ............ | 379/361 |
| 0093760 | 5/1986 | Japan ............................... | 379/361 |
| 2177862 | 1/1987 | United Kingdom ............... | 379/361 |

OTHER PUBLICATIONS

Your Telephone: Operation, Selection and Installation, 1983, "The Dial Tone", p. 25, Touch Tone System, p. 35.

Primary Examiner—James L. Dwyer
Assistant Examiner—M. Shehata
Attorney, Agent, or Firm—Blum Kaplan

[57] ABSTRACT

A sound generation circuit for producing a dual tone which includes memory circuitry for storing data for controlling production of the dual tone, selection circuitry for selecting data stored in the memory circuitry and frequency dividers for producing an output signal having a frequency which varies based on the data selected by the selection circuitry. The production of the dual tone is based on the output signal of the frequency dividing circuitry. The sound generation circuit also includes logic circuitry to inhibit selection by the selection circuitry of data for controlling production by the sound generation circuit of a musical note when the sound generation circuit is currently producing a dual tone. The melody and dial sections of the sound generation circuit employ common elements.

69 Claims, 8 Drawing Sheets

SOUND GENERATION CIRCUIT

This is a continuation of application Ser. No. 07/784,742, filed Oct. 29, 1991, for SOUND GENERATION CIRCUIT, now abandoned, which in turn is a continuation of application Ser. No. 07/412,367, filed Sep. 26, 1989, now abandoned.

BACKGROUND OF THE INVENTION

This invention is directed towards a sound generation circuit, and more particularly to dual tone generation circuitry for use with a push button telephone set.

As shown in FIG. 2, a conventional push button dial telephone set 200 with holding tone includes a polarity coincident circuit 30 having sections 30a and 30b. An input section 44, which is connected to a telephone communication line (not shown), couples the telephone communication line to polarity coincident circuit 30. The output of section 30a is connected to a ringing tone generation circuit (i.e., ringer circuit) 41 which produces a signal supplied to a speaker 42 for producing a ringing tone. The output of section 30b is connected to the emitter of a transistor 31a and to one end of a switch 31c. The other end of switch 31c is connected to the base of a transistor 31b. Transistors 31a and 31b and switch 31c serve as a dial pulse sending switch 31. The emitter of transistor 31b is connected to a reference voltage such as ground. The collector of transistor 31b is connected to a base of transistor 31a. The collector of transistor 31a is connected to an integrated circuit for speech (hereinafter referred to as speech IC) 32. The output of speech IC 32 is connected to a receiver 43.

Telephone set 200 also includes a keyboard 33 connected as inputs to an integrated circuit for dialing (hereinafter referred to as dial IC 34). An integrated circuit for control of switch input and other functions (hereinafter referred to as control IC) 35 has two outputs. The first output of control IC 35 is connected as an input to dial IC 34. The other output of control IC 35 is connected as an input to an integrated circuit for holding tone (hereinafter referred to as melody IC) 36. One of two outputs of dial IC 34 and the output of melody IC 36 are supplied as inputs to a mixing circuit 37 (i.e., for mixing holding tone and dial tone signals together). The other output of dial IC 34 is connected to the base of transistor 31b. A low pass filter 38 filters out all but the low frequencies of the signal produced by mixing circuit 37. The output of low pass filter circuit 38 is supplied to speech IC 32.

Another output of speech IC 32 is supplied as an input to a loud speaker (or amplifier) circuit 39. A speaker 40 receives the output of circuit 39. Speech IC 32, dial IC 34, control IC 35, melody IC 36, mixing circuit 37, low pass filter 38 and loud speaker circuit 39 are each connected to the positive terminal of a voltage source V and to a reference voltage such as ground.

FIGS. 6A and 6B are block diagrams of melody IC 36 and dial IC 34. A more detailed description of all elements shown in FIGS. 6A and 6B, except a time setting circuit 100, is discussed below in connection with the present invention. Time setting circuit 100, shown in FIG. 6B, controls a timing dividing circuit 3. External circuitry (not shown) is also included within telephone set 200.

The number of parts required for construction of telephone set 200 prohibits its production at a reasonably moderate cost. As shown in FIGS. 6A and 6B, IC 36 and dial IC 34 include many of the same elements. For example, an oscillation circuit 1, a frequency dividing circuit 2, output frequency generation circuits 9 and 11, a digital/analog conversion circuit (hereinafter referred to as D/A circuit) 17 as well other elements are included in both melody IC 36 and dial IC 34. The duplicity of elements found in melody IC 36 and dial IC 34 complicates packaging of the sound generation circuit and results in conventional telephone set 200 having an unnecessarily high manufacturing cost.

Accordingly, it is desirable to provide a sound generation circuit having a simplified assembly, includes less parts and is less costly to manufacture than a conventional sound generation circuit.

SUMMARY OF THE INVENTION

Generally speaking, in accordance with the invention, a sound generation circuit includes memory circuitry for storing data for controlling production by the sound generation circuit of a dual tone, selection circuitry for selecting data stored in the memory circuitry, and frequency dividing circuitry for producing an output signal having a frequency which varies based on the data selected by the selection circuitry. Production of the dual tone is based on the output signal of the frequency dividing circuitry.

The memory circuitry includes at least a first memory for storing data associated with the tempo of the musical note and a second memory for storing data associated with the note length of the musical note. The output signal of the frequency dividing circuitry when at a first frequency is associated with a musical note and when at a second frequency is associated with a dial tone.

The sound generation circuit further includes additional memory circuitry for storing data for controlling the scale of the musical note and for controlling the frequencies of the dual tone. Additional selecting circuitry serves to select data stored in the additional memory circuitry. Additional frequency dividing circuitry produces an additional output signal having a frequency which varies based on the data selected by the additional selection circuitry.

Logic circuitry is provided to inhibit selection by the selection circuitry of data for controlling the production by the sound generation circuit of the musical note when the sound generation circuit is currently producing a dial tone.

The frequency dividing circuitry is operable for producing its output signal as a pulse train. The memory circuitry also stores and the selection circuitry also selects data for controlling timing of the pulse train. The sound generation circuit includes dial control circuitry for controlling production of pause, break, make and mute time signals by the sound generation circuit in response to the pulse train.

The additional memory circuitry is responsive to the output signal of the frequency dividing circuitry for advancing the address of the data to be read out from the additional memory circuitry. The memory circuitry is responsive to the selected data of the additional memory circuitry for advancing the address of the data to be read out by the frequency dividing circuitry. In particular, the memory circuitry is responsive to the selected data of the additional memory circuitry representing the length of the musical note. The additional frequency dividing circuitry is responsive to the selected data of the additional memory circuitry which represents the scale of the musical note.

The sound generation circuit also includes waveform memories for storing waveform data corresponding to the dual tone. The address of the data to be read out from the waveform memories is based on the additional output signal of the additional frequency dividing circuitry.

In an alternative embodiment of the invention, the selection circuitry selects the waveform data to be read out from the waveform memory circuitry. In both embodiments of the invention, a digital to analog converter, converts the digitized waveform data read out from the waveform memories to an analog equivalent. Preferably, the additional memory circuitry includes two memories and the additional frequency dividing circuitry includes two frequency dividers. One of the two memories and one of the two frequency dividers is associated with formation of the main melody of the musical sound and a group of high frequencies which are part of the dual tone. The other of the two memories and the other of the two frequency dividers is associated with formation of an accompaniment of the musical sound and a group of low frequencies which are part of the dual tone.

The melody IC and dial IC of the sound generation circuitry use many of the same elements. Accordingly, the number of ICs is reduced. IC miniaturization (i.e., 1 chip rather than 2 chip construction) and cost reduction are achieved. Since the number of parts for the sound generation circuit is decreased, packaging of the sound generation circuit is simplified.

Accordingly, it is an object of the invention to provide an improved sound generation circuit which is less costly to manufacture than a conventional sound generation circuit.

It is another object of the invention to provide an improved sound generation circuit in which many of the same elements for both the melody IC and dial IC of the sound generation circuit can be used.

It is a further object of the invention to provide an improved sound generation circuit in which the number of parts is decreased relative to a conventional sound generation circuit.

It is still another object of the invention to provide an improved sound generation circuit in which packaging of the sound generation circuit is simplified compared to a conventional sound generation circuit.

Still other objects and advantages of the invention will, in part, be obvious and will, in part, be apparent from the specification.

The invention accordingly, comprises an article of manufacture possessing the features, properties and relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
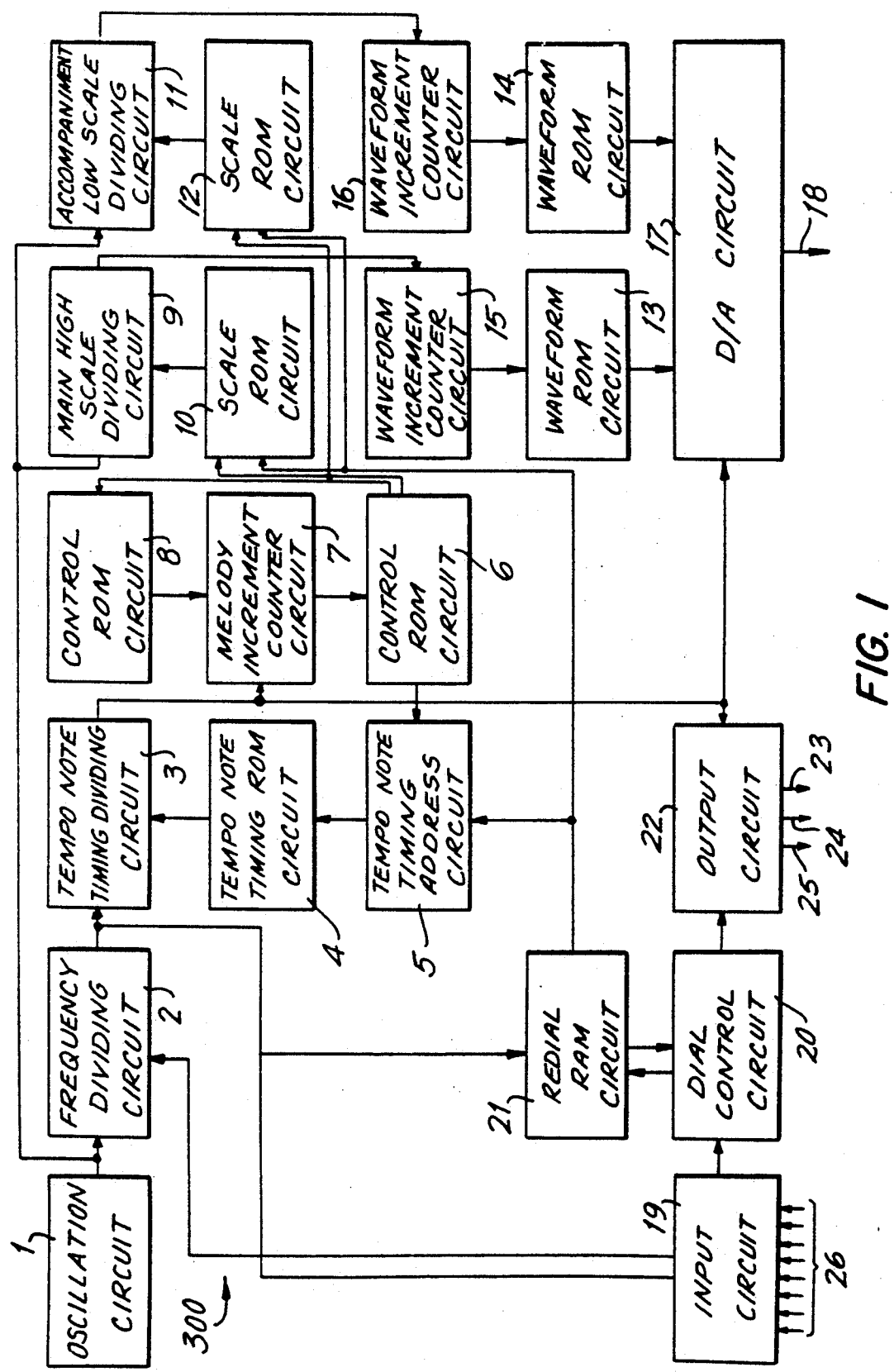
FIG. 1 is a block diagram of a sound generation circuit in accordance with one embodiment of the invention.

FIG. 1 illustrates a sound generation circuit 300 in accordance with one embodiment of the invention. Circuit 300 includes an oscillation circuit which includes a crystal oscillator or the like producing an oscillating signal which is supplied to a frequency dividing circuit 2, a main high scale dividing circuit 9 and an accompaniment low scale dividing circuit 11. Frequency dividing circuit 2 produces a signal which is at a lower frequency than the frequency of the oscillating signal produced by oscillating circuit 1 and is supplied to a tempo note and timing dividing circuit 3, an input circuit 19 and a redial RAM circuit 21. Tempo note and timing dividing circuit 3 generates a signal representing the tempo and note length of musical sounds and timing for a dial pulse based on varying the frequency of the signal produced by frequency dividing circuit 2.

As used herein and as discussed in greater detail below, a dual tone, associated with dual tone multifrequency dialing (DTMF), represents a pair of tones of different frequencies.

A read only memory (ROM) circuit 4 stores at each of its addresses a different frequency dividing ratio which is supplied to tempo note and timing dividing circuit 3 for controlling the variation in the frequency of the signal produced by tempo note and timing dividing circuit 3. A tempo note and timing address circuit 5 produces a signal supplied to tempo note and timing ROM circuit 4 representing the address of the frequency dividing ratio data which is to be supplied to tempo note and timing dividing circuit 3. The signal produced by tempo note and timing address circuit 5 is produced during the melody or dial mode of operation.

A control ROM circuit 6, also known as melody ROM circuit 6, stores scale and length data of a musical note representing the main melody and accompaniment for the main melody. A melody increment counter circuit 7 counts the output pulses produced by tempo note and timing dividing circuit 3 and increases the read address of control ROM circuit 6 for each tone to be produced. A ROM circuit 8 stores the read start address of melody increment counter circuit 7 and presets counter 7 according to the jump instructions produced from control ROM circuit 6 which, for example, can be used for repeating a subsection of a musical piece. The address of control ROM circuit 6 can be advanced by a loop formed from tempo note and timing dividing circuit 3, melody increment counter circuit 7, control ROM circuit 6, tempo note and timing address circuit 5 and tempo note and timing ROM circuit 4 based on the length of the musical note. The length of the musical note is supplied by control ROM circuit 6 to tempo note and timing address circuit 5. The scale of the musical note is supplied by control ROM 6 to a pair of scale ROM circuits 10 and 12.

Main high scale dividing circuit 9 generates a signal based on dividing the frequency of the oscillating signal produced by oscillation circuit 1 and has a frequency N times greater than the frequency of a note from a main melody or dial tone. The signal generated by main high scale dividing circuit 9 is within a group of high frequencies (i.e., 1209 Hz, 1336 Hz and 1477 Hz) and varies based on the control signal provided by scale ROM 10. The value of N is counted by a waveform increment counter 15 to produce a count value. This count value corresponds to one of a plurity of main (high) scales of a waveform stored in a waveform ROM circuit 13. Scale ROM circuit 10 stores at each of its addresses a frequency dividing ratio which controls the operation of main high scale dividing circuit 9.

An accompaniment low scale dividing circuit 11 generates a signal based on dividing the oscillating signal produced by oscillation circuit 1 which is N times greater than the frequency of a note from an accompaniment to the main melody and dial tone. The signal generated by accompaniment low scale dividing circuit 11 is within a group of low frequencies (i.e., 697 Hz, 770 Hz, 852 Hz and 941 Hz). A scale ROM circuit 12 stores in each of its addresses a frequency dividing ratio for controlling the operation of accompaniment low scale frequency dividing circuit 11. The output from circuit varies based on the frequency dividing ratio data supplied to circuit 11 from scale ROM circuit 12. The value of N is counted by a waveform increment counter 16 to produce a count value. This count value corresponds to one of a plurality of accompaniment (low) scales of a waveform stored in a waveform ROM circuit 14.

The addresses of ROM circuits 10 and 12 correspond to the scale data of the main melody and accompaniment stored in ROM circuit 6 and to the dial data produced by a redial random access memory (RAM) circuit 21. The signal produced by circuit 21, which is supplied to ROM circuits 10 and 12, represents the numerical dialed input by a user of generation circuit 300. Waveform ROM circuits 13 and 14 store output pulse waveforms of a musical note and output pulse waveforms (sine waves) of a dial tone. Waveform ROM circuit 13 and waveform ROM circuit 14 are associated with the main melody and dial tone high group and with the accompaniment and dial tone low group, respectively. Each waveform corresponds to a different N number. Waveform increment counter circuits 15 and 16 count the number of N outputs produced by frequency dividing circuits 9 and 11, respectively. The outputs of counters 15 and 16 advance the read addresses of ROM circuits 13 and 14, respectively.

Figure 2:
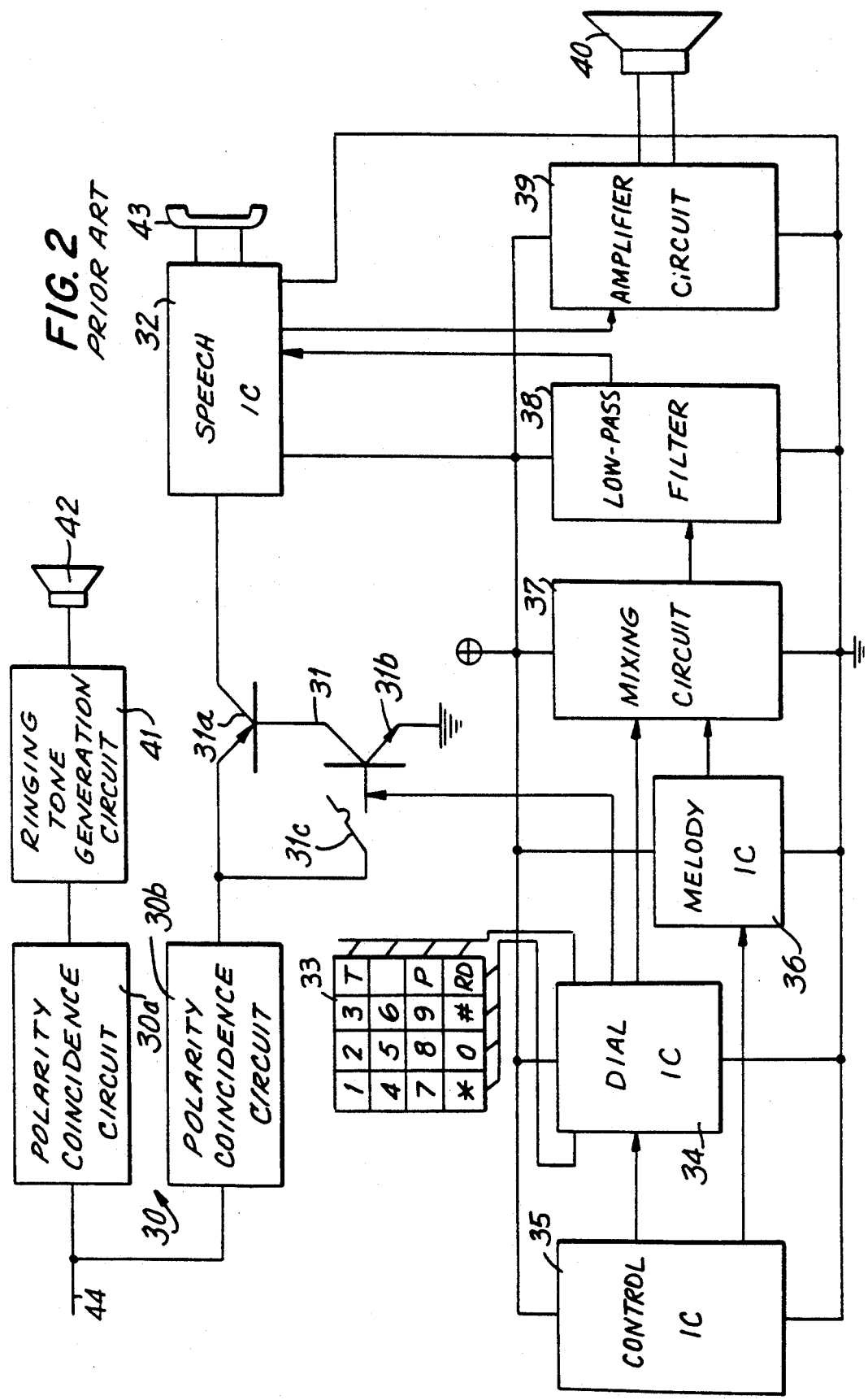
FIG. 2 is a block diagram of a conventional telephone set.

A digital to analog conversion circuit (hereinafter referred to as a D/A circuit) 17 receives the waveform data from ROM circuits 13 and 14 and produces at a output terminal 18 a signal representing a dual tone to be supplied to an amplifier of a speaker (e.g., amplifier 39 of FIG. 2) and a speech IC (e.g., speech IC 32 of FIG. 2). The dual tone signals produced by D/A circuit 17 have frequencies according to a musical scale and have pulse waveforms based on the waveforms stored in ROM circuits 13 and 14. There are 12 different sets of output frequencies which the dual tone can assume, that is, 3 sets of frequencies from the dual tone high group and 4 sets of frequencies from the dual tone low group (i.e., 3×4=12). These 12 different sets of frequencies correspond to the 12 different numerals shown on a dial (e.g., keyboard 33 of FIG. 2).

The signals produced by dividing circuits 9 and 10 have frequencies which are N times the frequency of the signal produced at output terminal 18. N is the same as the maximum count number of counters 15 and 16 and the number of sample points stored by waveform ROM circuits 13 and 14.

A dial key input circuit 19 receives an input signal 26 from a keyboard and produces an output signal supplied as an input to frequency dividing 2 and a dial control circuit 20. Redial RAM circuit 21 stores numerical input data from input circuit 19 (i.e., the dial key). Output circuit 22 receives a pulse train from tempo note and timing dividing circuit 3 and generates a dial pulse signal at an output terminal 23, a pulse mute signal at an output terminal 24 and a tone mute signal at an output terminal 25 based on dial control circuit 20. More particularly, output circuit 22 selectively produces either dial pulse signal, pulse mute signal or tone mute signal based on the output signal from tempo note timing dividing circuit 3.

The crystal oscillator of oscillation circuit 1 is of a general type and produces an oscillating frequency of 3.58 MHz. Frequency dividing circuit 2 is also of the general type having a frequency dividing ratio which can be changed based on a switching signal produced by input circuit 19. When the switching signal produced by input circuit 19 represents that sound generation circuit 300 is in its melody mode of operation, the 3.58 MHz signal produced by oscillation circuit 1 is divided by 55,296 to produce an output signal having a frequency of about 64 Hz. When the switching signal produced by input circuit 19 represents that sound generation circuit 300 is in its dial tone mode of operating, the 3.58 MHz signal is divided by 12,032 to produce an output signal of about 300 Hz. The outputs of frequency dividing circuit 2 are fundamental frequencies (each of which are hereinafter referred to as fundamental CK). If desired, the frequency of the output signal produced by frequency dividing circuit 2 can be changed to any arbitrary value by simply changing the frequency of the oscillating signal produced by oscillation circuit 1. For example, the frequency of the oscillating signal can be 4.0 MHz rather than 3.58 MHz.

Tempo note and timing dividing circuit 3 has a frequency dividing ratio controlled by ROM circuit 4 such that dividing circuit 3 serves as a programmable counter. As a programmable counter, circuit 3 generates a tempo frequency and a note frequency signal supplied to melody increment counter 7 based on the fundamental CK produced by frequency dividing circuit 2 during the melody mode of operation. Alternatively, during the dial (pulse) mode of operation, tempo note and timing dividing circuit 3 generates a pulse train, corresponding, but not limited, to a pause time, a make time, a break time and a mute time which is supplied to output circuit 22. The pause, make, break and mute times are described in greater detail below. The signals representing pause, make and break times are produced at output terminal 23 of output circuit 22. A pulse mute signal is produced at output terminal 24 of output circuit 22. Additionally, a tone sending time and nonsending time are produced by dividing circuit (programmable counter) 3 and supplied to D/A circuit 17 during the dial tone mode of operation. Consequently, a signal will be produced at terminal 18 of D/A circuit 17 representing dial tone only during the dial tone mode of operation. During a tone mute mode of operation, a tone mute signal is produced at output terminal 25 of output circuit 22 based on the pulse train produced by dividing circuit 3.

Figure 3:
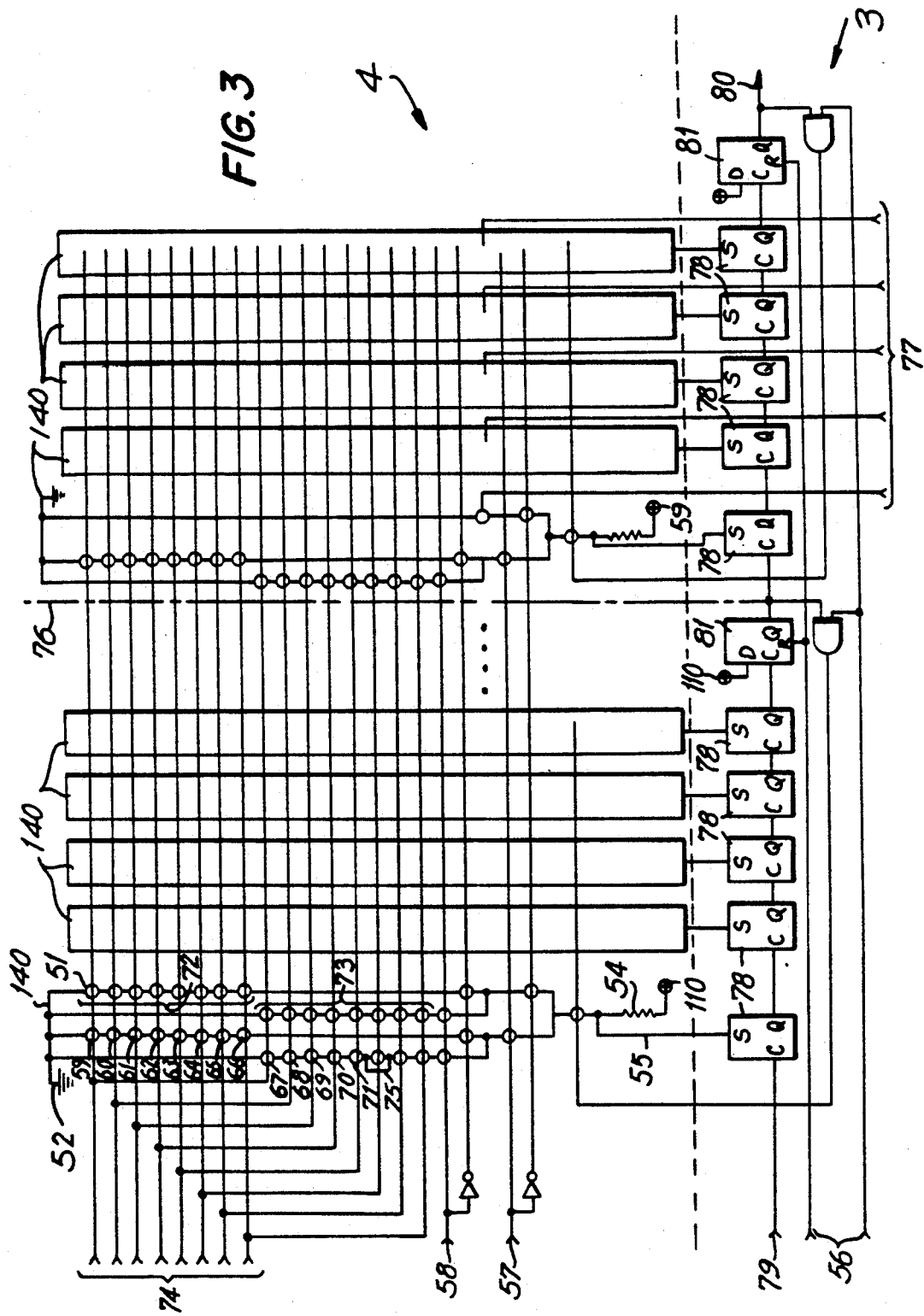
FIG. 3 is a schematic diagram of the tempo note, frequency dividing and ROM circuits of FIG. 1.

ROM circuit 4 and tempo note and timing (i.e., interval and tone) dividing circuit 3 are shown in greater detail in FIG. 3. Circuits 3 and 4 each include a plurality of identical cells 140. Cell 140 furtherest to the left in FIG. 3 will now be described in detail. Cell 140 includes a plurality of N-channel insulating gate field effect (hereinafter referred to as N-ch) transistors such as N-ch transistor 51 which is identified in FIG. 3 by circles (O). A plurality of N-ch transistors connected in series form a memory cell. Eight signal lines 74 from input circuit 19 serve as address lines and are connected to the gates of each of N-ch 59-73. Only one of the eight signal lines 74 is provided with a low logic level with the remaining seven signal lines 74 carrying high logic level signals. All N-ch transistors other than the N-ch transistor receiving a low logic level gate signal are in a conductive state (i.e., turned on). Each of the memory cells is coupled to a ground (GND) 52 and, through a pull up resistor 54, to positive terminal 110 of a d.c. voltage source. When a low logic signal is inputted to the gate of N-ch transistor 75, which is short circuited between its source and drain by a metallic wire or the like, a low logic level signal is produced on a line 55. When no low logic signal is provided to the gate of N-ch transistor 75, a pull up resistor 54 will maintain a high logic level on line 55. In other words, a flip flop 78 furtherest to the left in FIG. 3 will be set except when a low logic level signal is supplied to the gate of N-ch transistor 75.

The logic levels of the signals provided on signal lines 74 are determined by which of the N-ch transistors has been short circuited. An input terminal 57 receives a signal representing whether the ROM is to read either melody or dial tone. An input terminal 58 receives a signal for switching which music data is to be read at the time that circuit 300 is in a melody mode of operation and which pulse or tone data is to be read at the time that circuit 300 is in the tone dial mode of operation. A pair of input terminals 56 receive a ROM output control signal.

Pulse circuits recognize the dial number by the number of pulses provided. Generally, pulses are generated at either 10 pulses/second (i.e., 10 pps) or 20 pulses/second (20 pps).

N-channel transistors 59-66 serve as ROMs for generating pulse timing signals of 10 pps. N-channel transistors 59 and 63 each generate pulse timings of 20 pps for producing a make time. N-channel transistors 60 and 64 generate pulse timings for producing a break time. N-channel transistors 61, 62, 65 and 66 generate pulse timings associated with interpause time, mute time, etc. . . . N-channel transistors 67-70 serve as ROMs for producing timing signals during the tone mode of operation. More particularly, N-channel transistor 67 produces timing signals associated with the prepause time, N-channel transistor 68 produces timing signals associated with tone sending time and N-channel transistors 69 and 70 produce timing signals associated with the tone non-sending time. N-channel transistor 71 generates timing signals for producing a pause time and other time periods. N-channel transistors 72 and 73 serve as ROMs for storing data for setting a tempo of a first musical note and a second musical note, respectively.

The left side of a dashed line 76 of FIG. 3 represents the tempo section of a ROM for storing tempo data. The right side of line 76 represents the note length section of a ROM for generating note length information. Dividing circuit 3 produces an output signal 77. ROM output control signal 56 is provided by melody control ROM circuit 6.

The signal supplied on line 55 is connected to the set(S) input of flip flop 78. When at a high logic level, line 55 sets flip flop 78. Dividing circuit 3 includes a plurality of flip flops 78 corresponding to the plurality of cells 140. Each flip flop 78 serves as a ½ frequency divider. The first flip flop 78 (positioned furtherest to the left in FIG. 3) receives a fundamental CK 79 from frequency dividing circuit 2 as its clock signal. The Q output of this first flip flop 78 is connected to a clock input of one of the other flip flops 78. These other flip flops 78 associated with the tempo section of ROM 4 are connected in cascade with the Q output of each flip flop 78 connected to the clock (C input of the next flip flop 78. The last flip flop 78 in the tempo section of ROM 4 is connected to a flip flop 81. The D output of flip flop 81 associated with the tempo section of ROM 4 is connected to positive terminal 110 of the DC voltage source. A reset (R) terminal of flip flop 81 receives one of the control signals from control ROM circuit 6. The Q output of flip flop 81 is connected to the clock input of the first of a plurality of flip flops 78 in the note length section of the ROM. The inputs of a first of two AND gates 120 are connected to the Q output of flip flop 81 and to one of the control lines 56 from control ROM circuit 56. The output of first AND gate 120 is connected to the gate of a N-ch transistor 88 which is serially coupled to memory cell 140 furtherest to the left in FIG. 3.

Flip flops 78 in note length section of ROM 4 are also connected in cascade with the Q output of the last flip flop 78 (furtherest to the right in FIG. 3) being connected to the clock input of a second flip flop 81. A reset (R) terminal of second flip flop 81 is connected to the R terminal of the first flip flop 81. Accordingly, both the first and second flip flops 81 are reset at the same time. The Q output of second flip flop 81 is connected to an input of second AND gate 120. The other input of second AND gate 120 is connected to the same control line 56 which first AND gate 120 is connected to. The output of second AND 120 is connected to a second N-ch transistor 88. Second N-ch transistor 88 is serially coupled to cell 140 which is furtherest to the left within the note length section of FIG. 3. The Q output of second flip flop 81 also serves as output 80 of frequency dividing circuit 3. Each cell 140 is programmed separately from each other (i.e., which of N-ch transistors are short circuited). Output 80 connected to the Q output of second flip flop 81 is supplied to the melody increment counter circuit 7, output circuit 22 and D/A 17.

Figure 4:
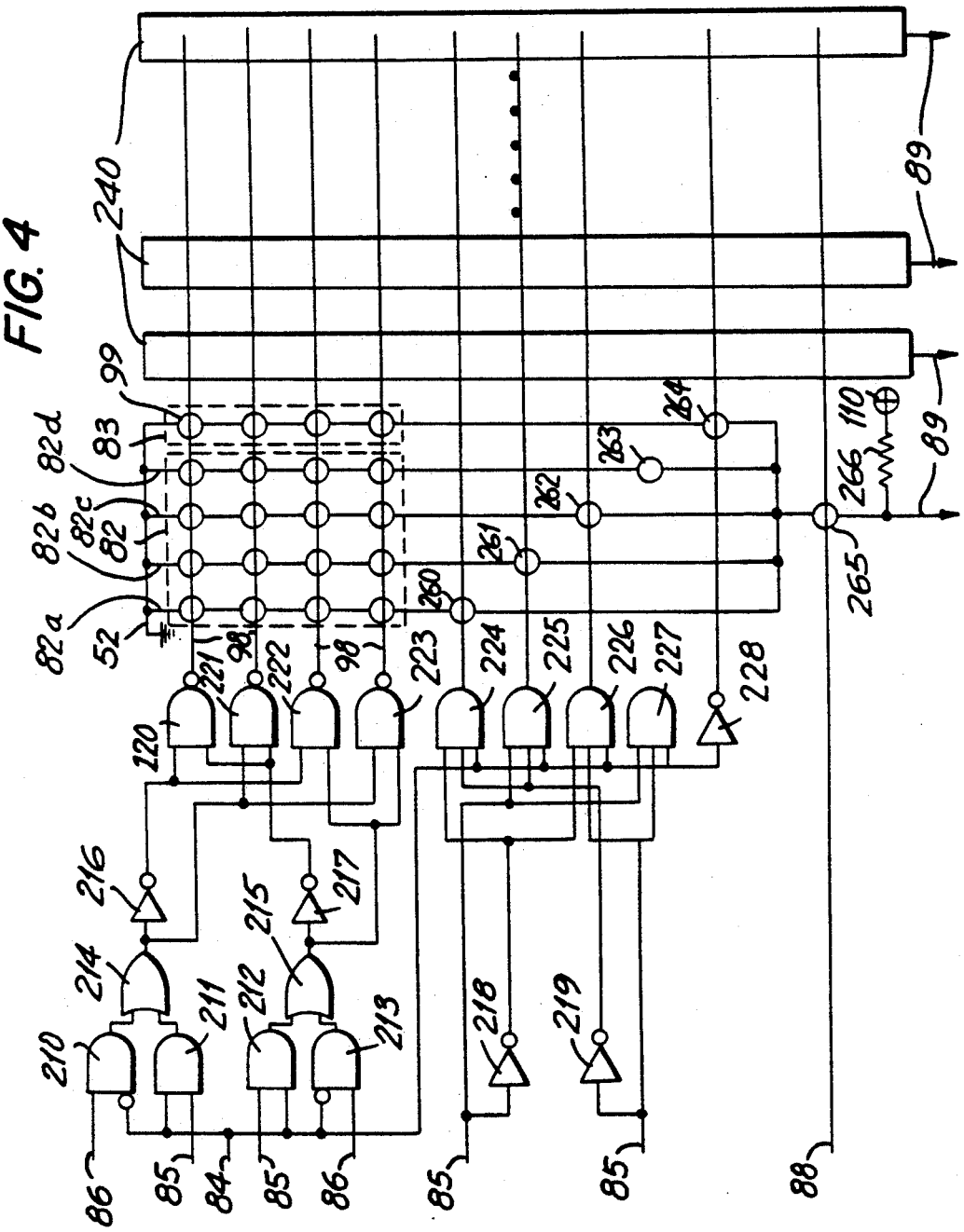
FIG. 4 is a combination logic and schematic diagram of the scale dividing circuits of FIG. 1.

Frequency dividing circuits 9 and 11 are controlled by ROM circuits 10 and 12, respectively. As shown in FIG. 4, ROM circuits 10 and 12 are substantially identical in construction and include a plurality of cells 240, one cell of which will now be described. Cell 240 includes a plurality of N-ch transistors identified by circles (O) 99. The 16 N-ch transistors within a first set of dashed lines form a subcell 82. Similarly, the four N-ch transistors within another set of dashed lines form a subcell 83. Four different address lines 98 provide gate signals to the N-ch transistors 99. Construction of subcells 82 and 83 is similar to the cells shown in FIG. 3. ROM circuits 10 and 12 each include a plurality of AND gates 210-213 and 224-227; OR gates 214, 215, inverters 216-219 and 228 and a plurality of NAND gates 220-223. The outputs of AND gates 210 and 211 serve as inputs to OR gate 214. Similarly, the outputs of AND gates 212 and 213 serve as inputs to OR gate 215. The output of OR gate 214 is supplied as inputs to inverter 216 and NAND gates 221 and 223. The output of OR gate 215 is supplied as inputs to inverter 217 and NAND gates 222 and 223. The output of inverter 216 is supplied as inputs to NAND gates 220 and 222. The output of inverter 217 is supplied as inputs to NAND gates 221 and 223. The output of inverter 218 is provided as inputs to AND gates 224 and 226. Similarly, the output of inverter 219 is provided as inputs to AND gates 224 and 225.

A scale data signal provided at input terminal 85 selects the melody scale and is supplied by control ROM circuit 6. The scale data signal is supplied as inputs to AND gates 211, 212, 225 and 227. A signal at an input terminal 84 assumes a high logic level during the melody mode of operation and a low logic level during the dial mode of operation. The signal at input terminal 84 is supplied as an inverted input to AND gates 210 and 213 and as a noninverted input to AND gates 211, 212 and 224–227 and to inverter 228. A scale data signal at input terminal 85 is supplied as inputs to AND gates 211, 212, 225 and 227 and inverters 218 and 219. The outputs of NAND gates 220–223 are connected to subcell 82 through address lines 98.

The outputs of AND gates 224–227 are connected to the gates of a plurality of N-ch transistors 260–263, respectively. The output of inverter 228 is connected to the gate of a N-ch transistor 264. Subcell 82 includes four columns 82a, 82b, 82c and 82d of N-ch transistors 99. Columns 82a, 82b, 82c and 82d are serially connected to N-ch transistors 260, 261, 262 and 263, respectively. Subcell 83 is serially connected to N-ch transistor 264.

A dial data signal at input terminal 86, which represents a selected dial tone, is provided by redial RAM circuit 21 as an input to AND gates 210 and 213. Subcell 82 stores melody scale data. Subcell 83 stores dial tone frequency data. Subcells 82 and 83 each serve as decoders for decoding the scale data from ROM 6.

When signal 84 is at a low logic level subcell 83 is selected. A ROM sent signal 88 generated by scale dividing circuits 9 or 11 serve as a gate signal to a N-ch transistor 265 which is serially connected to each of N-ch transistors 260–264. A pull up resistor 266 connected at one end to positive terminal 110, maintains an output 89 at a high logic level when ROM sent signal 88 is at a low logic level. Output 89 is connected to the input of scale dividing circuit 9 when the circuitry of FIG. 4 serves as ROM circuit 10 and is connected to the input of scale dividing circuit 11 when the circuitry of FIG. 4 serves as ROM circuit 12. Counters 9 and 11 each operate as frequency dividing circuits based on the signal at output 89.

Waveform ROMs circuits 13 and 14 store waveforms used during the melody mode and dial mode operations. Appropriate switching controls which of these waveforms is produced by ROMs 13 and 14.

Figure 5:
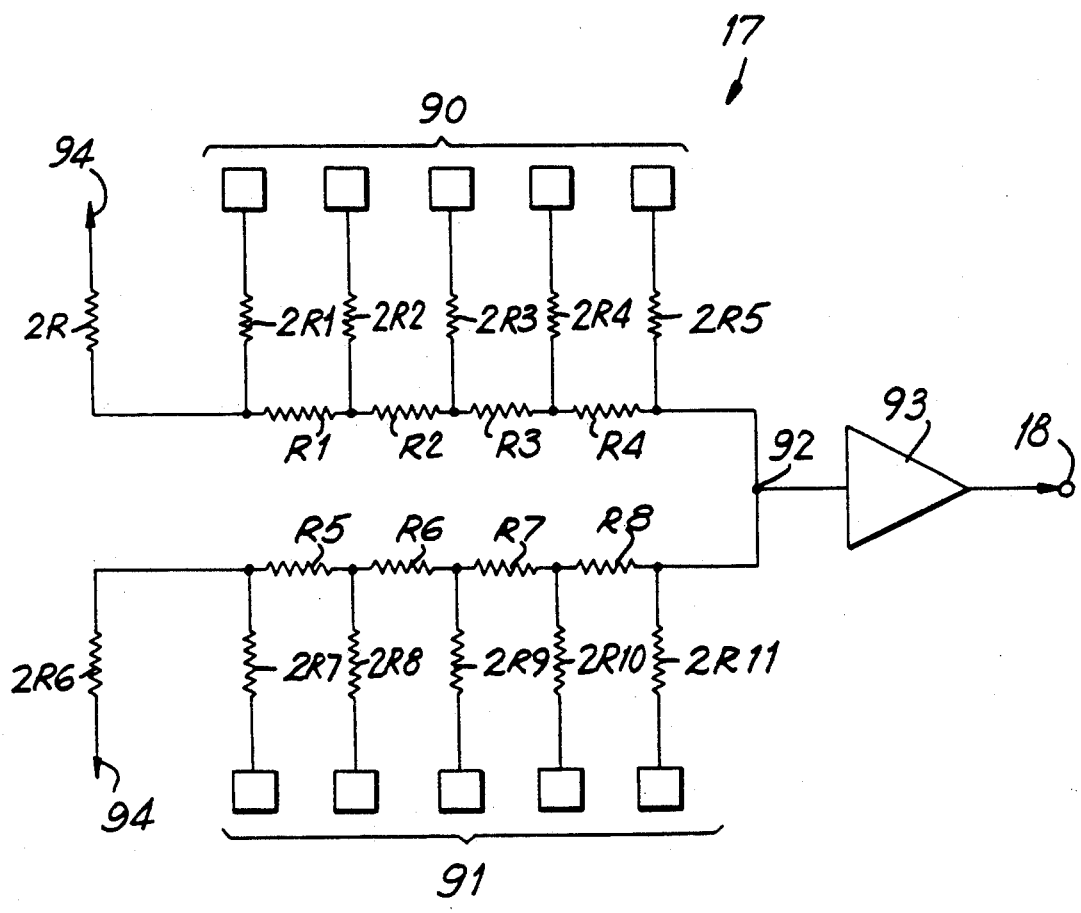
FIG. 5 is a schematic diagram of the D/A circuit of FIG. 1.

As shown in FIG. 5, D/A circuit 17 includes a plurality of inputs 90 which receive either a main melody or dial tone group of high frequencies from waveform ROM circuit 13. A plurality of inputs 91 receive an accompaniment or dial tone group of low frequencies from waveform ROM circuit 14. The signals received from inputs 90 and 91 are mixed at node 92 and supplied as an input to an amplifier 93. The output of amplifier 93 is provided to output 17 of D/A circuit 17.

The positive terminal of a voltage source (e.g., $V_{SS}$) 94 is connected to one end of a resistor 2R and one end of a resistor 2R6. Each of the five inputs 90 is connected to one end of each of five resistors 2R1, 2R2, 2R3, 2R4 and 2R5. The other end of resistor 2R1 is connected to the other end of resistor 2R and one end of a resistor R1. The other end of resistor R1 is connected to one end of a resistor R2 and the other end of resistor 2R2. The other end of resistor R2 is connected to one end of a resistor R3 and the other end of resistor 2R3. The other end of resistor R3 is connected to one end of a resistor R4 and the other end of resistor 2R4. The other end of resistor R4 is connected to the other end of resistor 2R5 and node 92.

The plurality of inputs 91 are connected to corresponding first ends of resistors 2R7, 2R8, 2R9, 2R100 and 2R11. The other end of resistor 2R6 is connected to one end of a resistor R5 and the other end of resistor 2R7. The other end of resistor R5 is connected to one end of resistor R6 and the other end of resistor of 2R8. The other end of resistor R6 is connected to one end of resistor R7 and the other end of resistor 2R9. The other end of resistor R7 is connected to one end of a resistor R8 and the other end of resistor 2R10. The other end of resistor R8 is connected to the other end of resistor 2R11 and node 92.

Figure 6A:
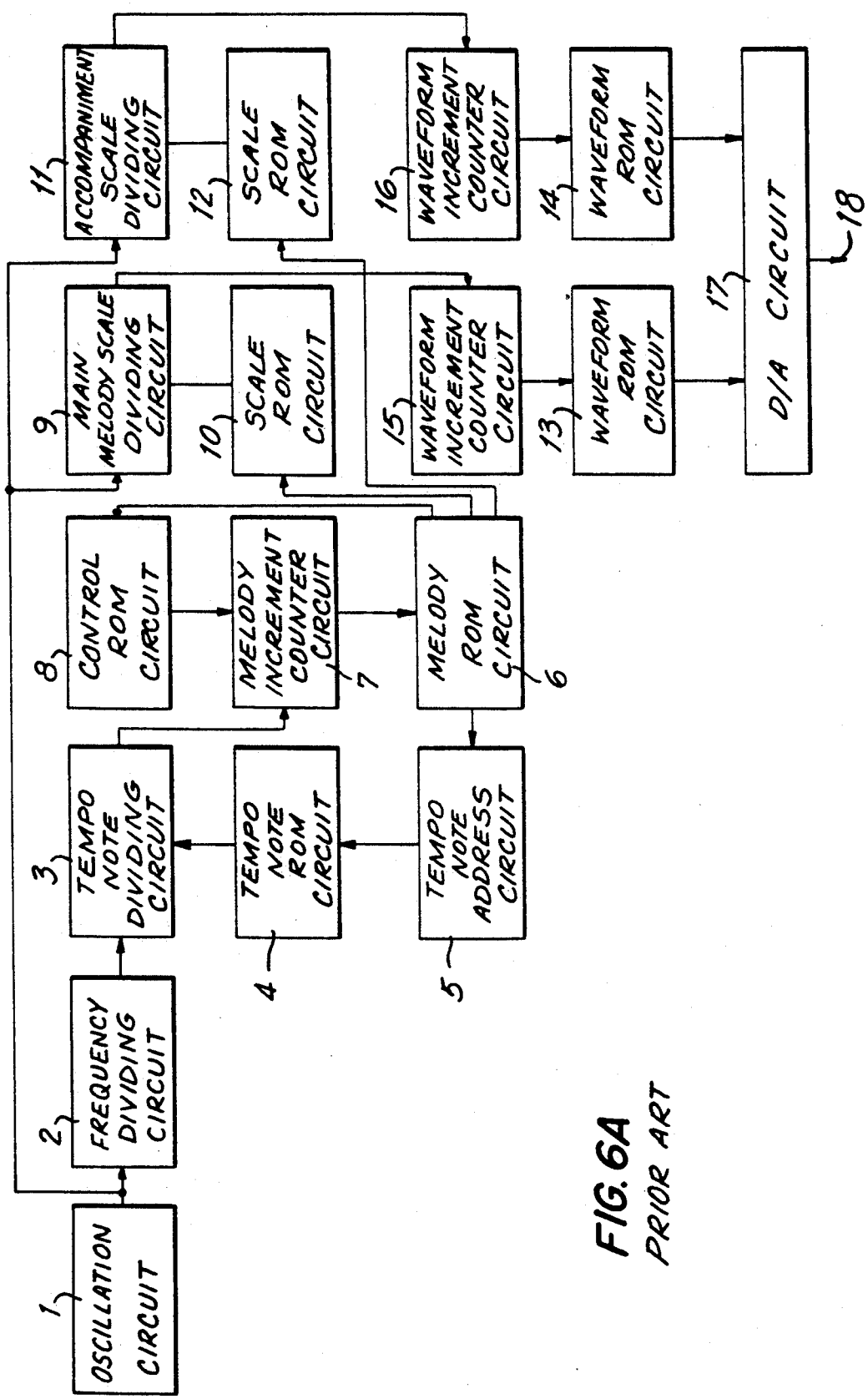
FIGS. 6A and 6B are block diagrams of the melody IC and dial IC of FIG. 2 respectively.
Figure 6B:
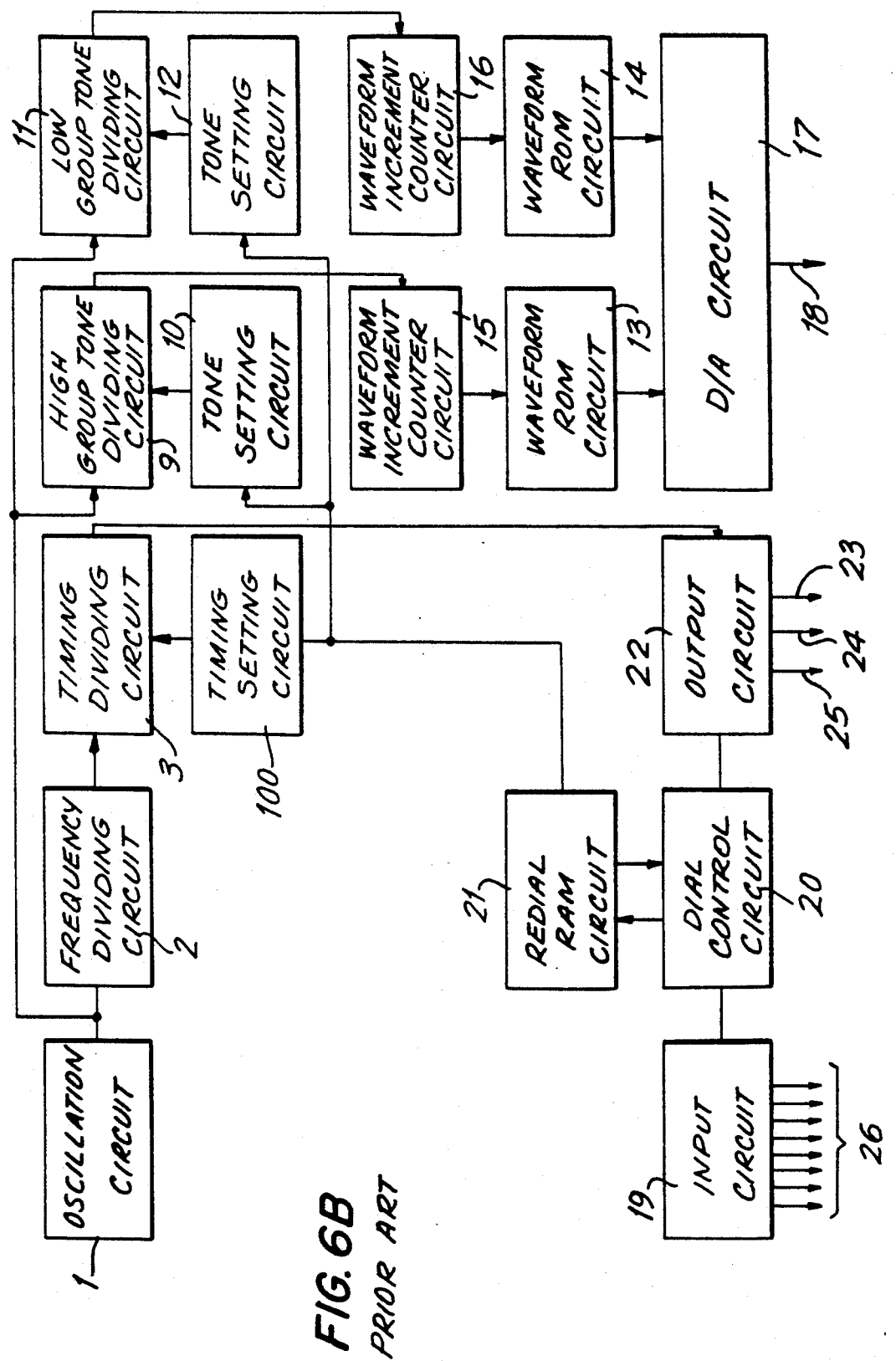

Key input circuit 19, dial control circuit 20, redial RAM circuit 21 and output circuit 22 are substantially similar to conventional dial ICs. Referring once again to FIGS. 6(A) and 6(B), which illustrate a conventional melody IC and a conventional dial IC, respectively, the substantial similarity between these circuits includes the following:

(a) Oscillation circuit 1;
(b) Frequency dividing circuit 2;
(c) Tempo note and timing dividing circuit 3 (i.e., the frequency dividing circuitry for tempo and note data during melody mode and timing data during the dial mode);
(d) Scale dividing (output frequency generation) circuits 9 and 10 (i.e., sound generation circuitry for main melody and accompaniments during melody mode; tone generation circuit for high group and low group);
(e) Waveform ROM circuits 13 and 14 and waveform increment counter circuits 15 and 16; and
f) D/A circuit 17.

In contrast thereto, in accordance with the invention, the melody IC and the dial IC use many of the same circuit elements thereby reducing the number of elements required for the sound generation circuit.

Figure 7:
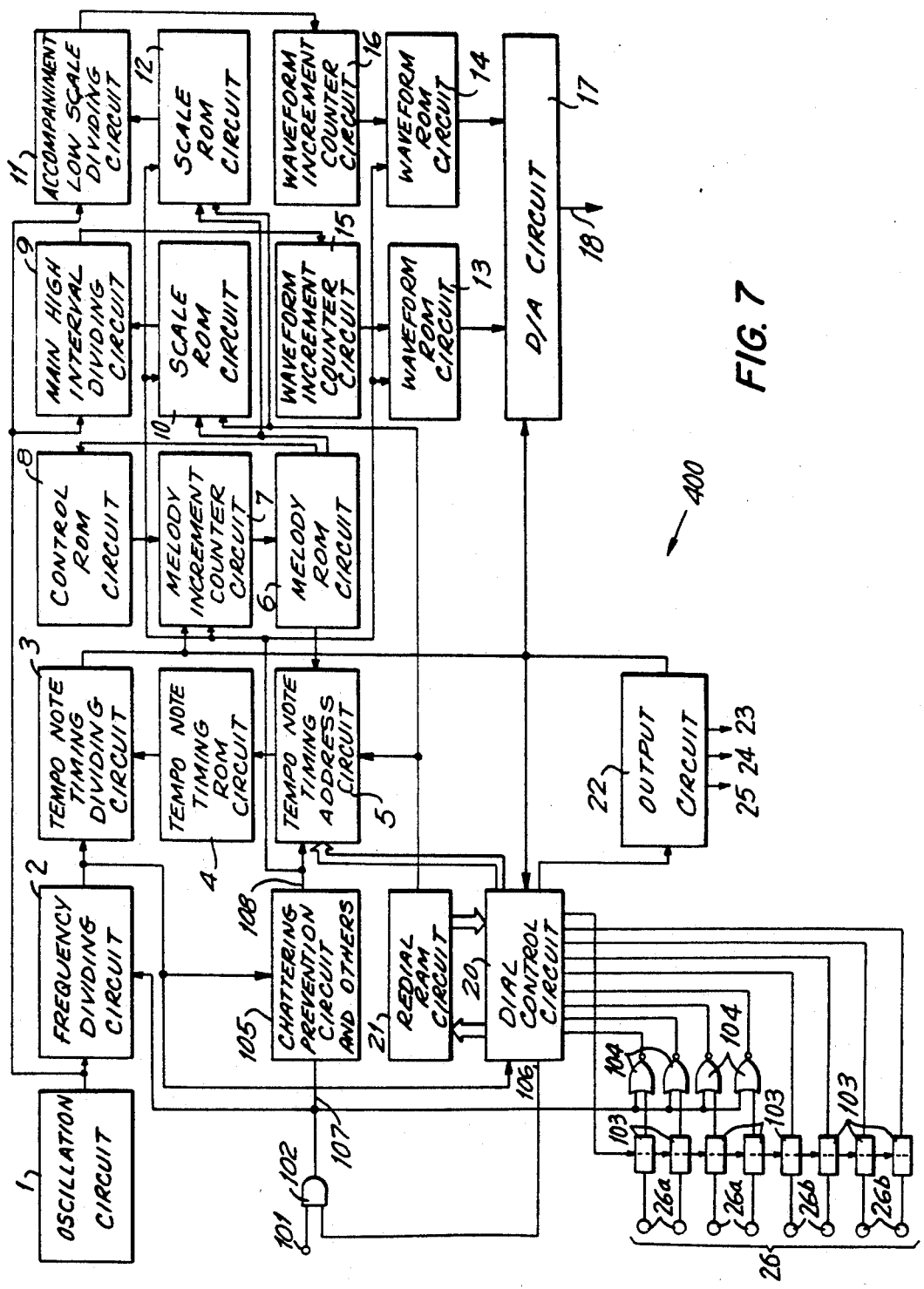
FIG. 7 is a block diagram of a sound generation circuit in accordance with an alternative embodiment of the invention.

As shown in FIG. 7, a sound generation circuit 400 in accordance with an alternative embodiment of the invention illustrates one of a variety of suitable switching methods for operating a sound generation circuit during the melody and dial modes of operation. When a high logic level is provided to a melody start terminal 101, circuit 400 begins its melody mode of operation and continues to operate in a melody mode until the signal at melody start terminal 101 assumes a low logic level.

Terminal 101 is connected as an input to an AND gate 102. The other input of AND 102 is connected to an output 106 of dial control circuit 20. Output 106 assumes a low logic level during the dial mode of operation and assumes a high logic level once the dial mode of operation ends. Accordingly, the melody mode of operation does not take place before the dial mode of operation ends whether or not melody start terminal 101 is at a high logic level.

Dial key input terminal 26 includes four terminals 26a and four terminals 26b. The dial key input signal provided by dial key input terminal 26 is supplied to dial control circuit 20 through eight input circuits 103 and four NOR gates 104. The dial keys, such as the keys of keyboard 33 of FIG. 2, are arranged in four horizontal rows and four vertical columns for use with a push button dial telephone. The key from keyboard 33 which is selected (pushed down) can be defined as within one of four vertical columns and within one of four horizontal rows of keyboard 33. Terminals 26a correspond to the four dial keys within the vertical column of keys chosen and terminals 26b represent the dial keys within the horizontal row of keys chosen. By combining the eight signals supplied to dial key input terminal 26 the selected key is identified.

Each of the eight inputs of dial key input terminal 26 are connected to one of a corresponding eight input circuits 103. The outputs from the four input circuits 103 receiving the input signals from terminals 26a each produce an output signal supplied to an input of a corresponding NOR gate 104. More particularly, each of the NOR gates 104 receives a signal from one of four input circuits 103 associated with the vertical column of keys chosen. The outputs from NOR gates 104 and from input circuits 103 which receive signals from terminals 26b are supplied as inputs to dial control circuit 20. An output 107 of AND gate 102 is supplied as an input to a gate circuit 105, frequency dividing circuit 2 and to each of the four NOR gates 104.

During the melody mode of operation when output 107 is at a high logic level, the outputs from NOR gates 104 will be at a low logic level (i.e., the signals supplied to dial control circuit 2 corresponding to the keys in the vertical column from which the selected key is depressed will be at a low logic level). Sound generation circuit 400 will be prevented from entering into a dial mode of operation.

Additional gate circuitry may be added, as desired, between input circuits 103 and dial control circuit 20. Alternatively or in addition thereto, gate circuitry may be added between dial key input terminal 26 and input circuits 103. The signal produced at output 107 of AND gate 102 serves as a control signal for frequency dividing circuit 2. During the dial mode of operation, this control signal is at a low logic level such that frequency dividing 2 produces an output signal at a different frequency than during the melody mode of operation. Gate circuit 105 serves as either a chattering prevent, delay or pulse circuit or the like and produces set and reset pulses 108 at the beginning and end of the melody mode of operation. The set and reset pulses 108 of the signal produced by gate circuit 105 is substantially the same as the signal produced at output 107 of AND gate 102 except that delay intervals have been added. The chattering component of the signal produced at output 107 is removed by gate circuit 105. The set and reset pulses 108 are supplied to tempo note and timing address circuit 5, melody increment counter circuit 7, scale ROM circuits 10 and 12 and waveform ROM circuits 13 and 14. This signal also can be supplied to other circuits and serves as a switching signal for switching the elements of sound generation circuit 400 between the melody and dial modes of operation.

Referring once again to FIGS. 3 and 4, signal 108 is the same as signal 57 of FIG. 3 and the signal supplied at input terminal 84 of FIG. 4. Signal 108 presets address circuit 5 and increments counter circuit 7 to switch to an initial read address. It is to be understood, however, that although circuit 105 can serve as a chattering prevent circuit or the like, circuit 105 is not necessary for operation of the invention. That is, the signal from output 107 and signal 108 may be one and the same. Similarly, other logic gate circuitry can be used in lieu AND gate 102 and NOR gates 104 to provide the same logic outputs.

During the dial tone mode, the frequency of the signal produced by D/A circuit 18 varies based on the key which is depressed such that the dial tone of the signal produced by the telephone varies. The tone sending time is the time during which the signal associated with a depressed key is produced by D/A circuit 18. The tone non-sending time is the time between signals produced at output 18 of D/A circuit 17. The tone mute signal generated at output 25 of output circuit 22 is a signal which serves to prevent (i.e., side out) signals which can occur before and after the tone signal. Accordingly, suppression of howling and other noises at the speaker of the telephone is achieved. The mute time represents the time interval between the production of signals at output 18. The pulse mode occurs outside of circuit 400 and pulses representing the inputted numeral information of the keyboard are generated at output 23 of output circuit 22. Interpause is a period of time between the sending of pulses representing one numeral to the sending of pulses representing the next numeral. The make time is the period of time between these pulses and the break time is the period of time of each pulse width. The pulse mute signal generated from output 24 of output circuit 20 prevents (forbids) signals before and after sending a pulse train so as to suppress (cut) discordant sounds.

It is also to be understood that the foregoing embodiments of the invention are merely illustrative and that changes can be made to these embodiments without departing from the spirit and scope of the invention. For example, construction of the tempo note and timing dividing circuit 3 and other timing circuits which are shown in FIGS. 1 and 7 as separate units can be modified so as to form one unit. Similarly, the circuitry of FIGS. 3 and 4 including the N-ch transistor can be constructed using P-ch transistor or bipolar transistors. The content, order, position and quantity and other parameters associated with the ROMs described herein, also can be modified. One or more of the ROMs also can be constructed as a decoder.

In accordance with the invention, a main melody and an accompaniment melody are generated. The scales of the main melody and accompaniment are stored in ROM 10 and ROM 12, respectively. Dividing circuits 9 and 11 vary division of their input signals in accordance with data supplied from ROM 10 and ROM 12, respectively. Signals having different frequencies are outputted from circuits 9 and 11. The dual tone of the main melody and accompaniment also can be made different from each other by using different pulse waveforms of sounds. Accordingly, ROMs 13 and 14 for storing each waveform and counters 15 and 16 for addressing each ROM are provided. Two signals having different frequencies and waveforms corresponding to the main melody and accompaniment are mixed by D/A circuit 17 and outputted at output terminal 18. One of the frequencies from the dual tone high frequency group (1209 Hz, 1336 Hz and 1477 Hz) and from the dual tone low frequency group (697 Hz, 770 Hz, 852 Hz and 941 Hz) are mixed and outputted at output terminal 18. The selected lower frequency and upper frequency when combined together form the dual tone. Therefore, ROMS 10 and 12 and dividing circuits 9 and 11 are required to provide these different combinations of main melody and accompaniment.

As now can be readily appreciated, a sound generation circuit in accordance with the invention can use common elements for both the melody IC and the dial IC. The number of ICs is reduced. IC miniaturization (i.e., 1 chip rather than 2 chip construction) and cost can be reduced. External parts such as mixing circuitry and providing suitable resistance for oscillating circuits and the like are not required. The cost of external parts associated with the sound generation circuit is reduced. Still further, since the number of parts for the sound generation circuit is decreased, packaging of the sound generation circuit is simplified. A significant decrease in the cost of the telephone set results.

It will thus be seen that the objects set forth above and those made apparent from the preceding description are efficiently attained and, since certain changes may be made in the above construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

What is claimed is:

1. A sound generation circuit, comprising:
   memory means for storing data for controlling production by the sound generation circuit of a dual tone;
   selection means for selecting the data stored in the memory means; and
   frequency dividing means for producing an output signal having a frequency which varies based on the data selected by the selection means;
   wherein production of said dual tone is based on the output signal of said frequency dividing means and wherein said memory means includes a first memory for storing data associated with the length of a musical note.

2. The sound generation circuit as claimed in claim 1, wherein said memory means includes a second memory for storing data associated with the tempo of the musical note.

3. The sound generation circuit as claimed in claim 1, wherein the output signal of the frequency dividing means when at a first frequency is associated with a musical note and when at a second frequency is associates with a dial tone.

4. The sound generation circuit as claimed in claim 3, further including speaker means for producing the dual tone based on the output signal of said frequency dividing means.

5. The sound generation circuit as claimed in claim 1, further including logic means to inhibit selection by said selection means of data for controlling production by the sound generation circuit of a musical note when said sound generation circuit is producing a dial tone.

6. The sound generation circuit as claimed in claim 5, further including speaker means for producing the dual tone based on the output signal of said frequency dividing means.

7. The sound generation circuit as claimed in claim 1, wherein said frequency dividing means is operable for also producing the output signal as a pulse train and said memory means is operable for also storing and said selection means is operable for also selecting data for controlling the timing of the pulse train.

8. The sound generation circuit as claimed in claim 7, further including dial control means for controlling production of pause, break, make and mute time signals by said sound generation circuit in response to said pulse train.

9. The sound generation circuit as claimed in claim 8, further including speaker means for producing the dual tone based on the output signal of said frequency dividing means.

10. The sound generation circuit as claimed in claim 1, further including additional memory means for storing data for controlling the scale of the musical note and for controlling the frequency of the dual tone.

11. The sound generation circuit as claimed in claim 10, wherein said additional memory means is responsive to said output signal of said frequency dividing means for advancing the address of the data to be read out from the additional memory means.

12. The sound generation circuit as claimed in claim 10, further including additional selection means for selecting data stored in said additional memory means.

13. The sound generation circuit as claimed in claim 12, wherein said additional frequency dividing means is responsive to the selected data of said additional memory means representing the scale of the musical note.

14. The sound generation circuit as claimed in claim 12, wherein said memory means is responsive to the selected data of said additional memory means for selecting the address of the data to be read out by said frequency dividing means.

15. The sound generation circuit as claimed in claim 14, wherein the memory means is responsive to selected data of said additional memory means representing the length of the musical note.

16. The sound generation circuit as claimed in claim 12, further including additional frequency dividing means for producing an additional output signal having a frequency which varies based on the data selected by the additional selection means.

17. The sound generation circuit as claimed in claim 16, wherein the additional memory means includes two memories and the additional frequency dividing means includes two frequency dividers, one of the two memories and one of the two frequency dividers being associated with formation of the main melody of a musical sound and a group of high frequencies which are part of the dial tone and the other of the two memories and the other of the two frequency dividers being associated with formation of an accompaniment of the musical sound and a group of low frequencies which are part of the dial tone.

18. The sound generation circuit as claimed in claim 16, further including speaker means for producing the dual tone based on the output signal of said frequency dividing means.

19. The sound generation circuit as claimed in claim 16, further including logic means to inhibit selection by said selection means of data for controlling production by the sound generation circuit of a musical note when said sound generation circuit is producing a dial tone.

20. The sound generation circuit as claimed in claim 19, wherein said frequency dividing means is operable for also producing the output signal as a pulse train and said memory means is operable for also storing and said selection means is operable for also selecting data for controlling the time of the pulse train.

21. The sound generation circuit as claimed in claim 20, further including dial control means for controlling production of pause, break, make and mute time signals by said sound generation circuit in response to said pulse train.

22. The sound generation circuit as claimed in claim 16, further including waveform memory means for storing waveform data corresponding to musical sound and dial tone.

23. The sound generation circuit of claim 22, wherein the address of the data to be read out from the waveform memory means is based on the additional output signal of the additional frequency dividing means.

24. The sound generation circuit of claim 22, wherein the selection means is operable for also selecting the waveform data to be read out from the waveform memory means.

25. The sound generation circuit of claim 24, further including digital to analog conversion means for converting the digitized waveform data read out from the waveform memory means to an analog equivalent.

26. The sound generation circuit of claim 24, wherein the address of the data to be read out from the waveform memory means is based on the additional output signal of the additional frequency dividing means.

27. The sound generation circuit of claim 26, further including digital to analog conversion means for converting the digitized waveform data read out from the waveform memory means to an analog equivalent.

28. A sound generation circuit, comprising:
memory means for storing data for controlling production by the sound generation circuit of a dual tone;
selection means for selecting the data stored in the memory means; and
frequency dividing means for producing an output signal having a frequency which varies based on the data selected by the selection means;
wherein production of said dual tone is based on the output signal of said frequency dividing means, and further including additional memory means for storing data for controlling the scale of a musical note and for controlling the frequencies of the dual tone.

29. The sound generation circuit of claim 28, further including logic means to inhibit selection by said selection means of data or controlling production by the sound generation circuit of a musical note when said sound generation circuit is producing a dial tone.

30. The sound generation circuit of claim 29, wherein said additional memory means is responsive to said output signal of said frequency dividing means for advancing the address of the data to be read out from the additional memory means.

31. The sound generation circuit of claim 28, wherein said frequency dividing means is operable for also producing the output signal as a pulse train and said memory means is operable for also storing and said selection means is operable for also selecting data for controlling the timing of the pulse train.

32. The sound generation circuit of claim 31, wherein production of the pulse train is also based on the length of the data selected by said selection means.

33. The sound generation circuit of claim 31, further including dial control means for controlling production of pause, break, make and mute time signals by said sound generation circuit in response to said pulse train.

34. The sound generation circuit of claim 33, further including speaker means for producing the dual tone based on the output signal of said frequency dividing means.

35. The sound generation circuit of claim 31, wherein said additional memory means is responsive to said output signal of said frequency dividing means for advancing the address of the data to be read out from the additional memory means.

36. The sound generation circuit of claim 35, further including dial control means for controlling production of pause, break, make and mute time signals by said sound generation circuit in response to said pulse train.

37. The sound generation circuit of claim 28, further including additional selection means for selecting data stored in said additional memory means.

38. The sound generation circuit of claim 37, wherein said additional frequency dividing means is responsive to the selected data of said additional memory means representing the scale of the musical note.

39. The sound generation circuit of claim 37, wherein said memory means is responsive to the selected data of said additional memory means for selecting the address of the data to be read out by said frequency dividing means.

40. The sound generation circuit of claim 39, wherein the memory means is responsive to selected data of said additional memory means representing the length of the musical note.

41. The sound generation circuit of claim 40, further including speaker means for producing the dual tone based on the output signal of said frequency dividing means.

42. The sound generation circuit of claim 37, further including logic means to inhibit selection by said selection means of data or controlling production by the sound generation circuit of a musical note when said sound generation circuit is producing a dial tone.

43. The sound generation circuit of claim 42, wherein said additional memory means is responsive to said output signal of said frequency dividing means for advancing the address of the data to be read out from the additional memory means.

44. The sound generation circuit of claim 43, wherein said memory means is responsive to the selected data of said additional memory means for selecting the address of the data to be read out by said frequency dividing means.

45. The sound generation circuit of claim 44, wherein the memory means is responsive to selected data of said additional memory means representing the length of the musical note.

46. The sound generation circuit of claim 45, further including speaker means for producing the dual tone based on the output signal of said frequency dividing means.

47. The sound generation circuit of claim 37, further including additional frequency dividing means for producing an additional output signal having a frequency which varies based on the data selected by the additional selection means.

48. The sound generation circuit of claim 47, wherein the additional memory means includes two memories and the additional frequency dividing means includes two frequency dividers, one of the two memories and one of the two frequency dividers being associated with formation of the main melody of a musical sound and a group of high frequencies which are part of the dial tone and the other of the two memories and the other of the two frequency dividers being associated with formation of an accompaniment of the musical sound and a group of low frequencies which are part of the dial tone.

49. The sound generation circuit of claim 47, further including logic means to inhibit selection by said selection means of data or controlling production by the sound generation circuit of a musical note when said sound generation circuit is producing a dial tone.

50. The sound generation circuit of claim 49, wherein the additional memory means includes two memories and the additional frequency dividing means includes two frequency dividers, one of the two memories and one of the two frequency dividers being associated with formation of the main melody of a musical sound and a group of high frequencies which are part of the dial tone and the other of the two memories and the other of the two frequency dividers being associated with formation of an accompaniment of the musical sound and a group of low frequencies which are part of the dial tone.

51. The sound generation circuit of claim 49, further including waveform memory means for storing waveform data corresponding to musical sound and dial tone.

52. The sound generation circuit of claim 51, wherein the address of the data to be read out from the waveform memory means is based on the additional output signal of the additional frequency dividing means.

53. The sound generation circuit of claim 51, wherein the selection means is operable for also selecting the waveform data to be read out from the waveform memory means.

54. The sound generation circuit of claim 53, wherein the address of the data to be read out from the waveform memory means is based on the additional output signal of the additional frequency dividing means.

55. The sound generation circuit of claim 53, further including digital to analog conversion means for converting the digitized waveform data read out from the waveform memory means to an analog equivalent.

56. The sound generation circuit of claim 47, further including waveform memory means for storing waveform data corresponding to musical sound and dial tone.

57. The sound generation circuit of claim 56, wherein the additional memory means includes two memories and the additional frequency dividing means includes two frequency dividers, one of the two memories and one of the two frequency dividers being associated with formation of the main melody of a musical sound and a group of high frequencies which are part of the dial tone and the other of the two memories and the other of the two frequency dividers being associated with formation of an accompaniment of the musical sound and a group of low frequencies which are part of the dial tone.

58. The sound generation circuit of claim 56, further including digital to analog conversion means for converting the digitized waveform data read out from the waveform memory means to an analog equivalent.

59. The sound generation circuit of claim 58, wherein the additional memory means includes two memories and the additional frequency dividing means includes two frequency dividers, one of the two memories and one of the two frequency dividers being associated with formation of the main melody of a musical sound and a group of high frequencies which are part of the dial tone and the other of the two memories and the other of the two frequency dividers being associated with formation of an accompaniment of the musical sound and a group of low frequencies which are part of the dial tone.

60. The sound generation circuit of claim 56, wherein the selection means is operable for also selecting the waveform data to be read out from the waveform memory means.

61. The sound generation circuit of claim 60, further including digital to analog conversion means for converting the digitized waveform data read out from the waveform memory means to an analog equivalent.

62. The sound generation circuit of claim 60, wherein the additional memory means includes two memories and the additional frequency dividing means includes two frequency dividers, one of the two memories and one of the two frequency dividers being associated with formation of the main melody of a musical sound and a group of high frequencies which are part of the dial tone and the other of the two memories and the other of the two frequency dividers being associated with formation of an accompaniment of the musical sound and a group of low frequencies which are part of the dial tone.

63. The sound generation circuit of claim 56, wherein the address of the data to be read out from the waveform memory means is based on the additional output signal of the additional frequency dividing means.

64. The sound generation circuit of claim 63, further including digital to analog means for converting the digitized waveform data read out from the waveform memory means to an analog equivalent.

65. The sound generation circuit of claim 63, wherein the additional memory means includes two memories and the additional frequency dividing means includes two frequency dividers, one of the two memories and one of the two frequency dividers being associated with formation of the main melody of a musical sound and a group of high frequencies which are part of the dial tone and the other of the two memories and the other of the two frequency dividers being associated with formation of an accompaniment of the musical sound and a group of low frequencies which are part of the dial tone.

66. The sound generation circuit of claim 63, further including speaker means for producing the dual tone based on the output signal of said frequency dividing means.

67. A sound generation circuit, comprising:
memory means for storing data for controlling production by the sound generation circuit of a dual tone;
selection means for selecting the data stored in the memory means; and
frequency dividing means for producing an output signal having a frequency which varies based on the data selected by the selection means;
wherein production of said dual tone is based on the output signal of said frequency dividing means, and wherein said memory means includes a first memory for storing data associated with the length of a musical note; and speaker means for producing the dual tone based on the output signal of said frequency dividing means.

68. The sound generation circuit as claimed in claim 67, wherein said memory means includes a second memory for storing data associated with the tempo of the musical note.

69. A sound generation circuit, comprising:

memory means for storing data for controlling production by the sound generation circuit of a dual tone;

selection means for selecting the data stored in the memory means;

frequency dividing means for producing an output signal having a frequency which varies based on the data selected by the selection means;

wherein production of said dual tone is based on the output signal of said frequency dividing means;

further including additional memory means for storing data for controlling the scale of a musical note and for controlling the frequencies of the dual tone; and speaker means for producing the dual tone based on the output signal of said frequency dividing means.

* * * * *